April 9, 1940.                F. E. STAHL                2,196,686
                         METHOD OF MAKING CHAINS
                          Filed April 8, 1938        3 Sheets-Sheet 1
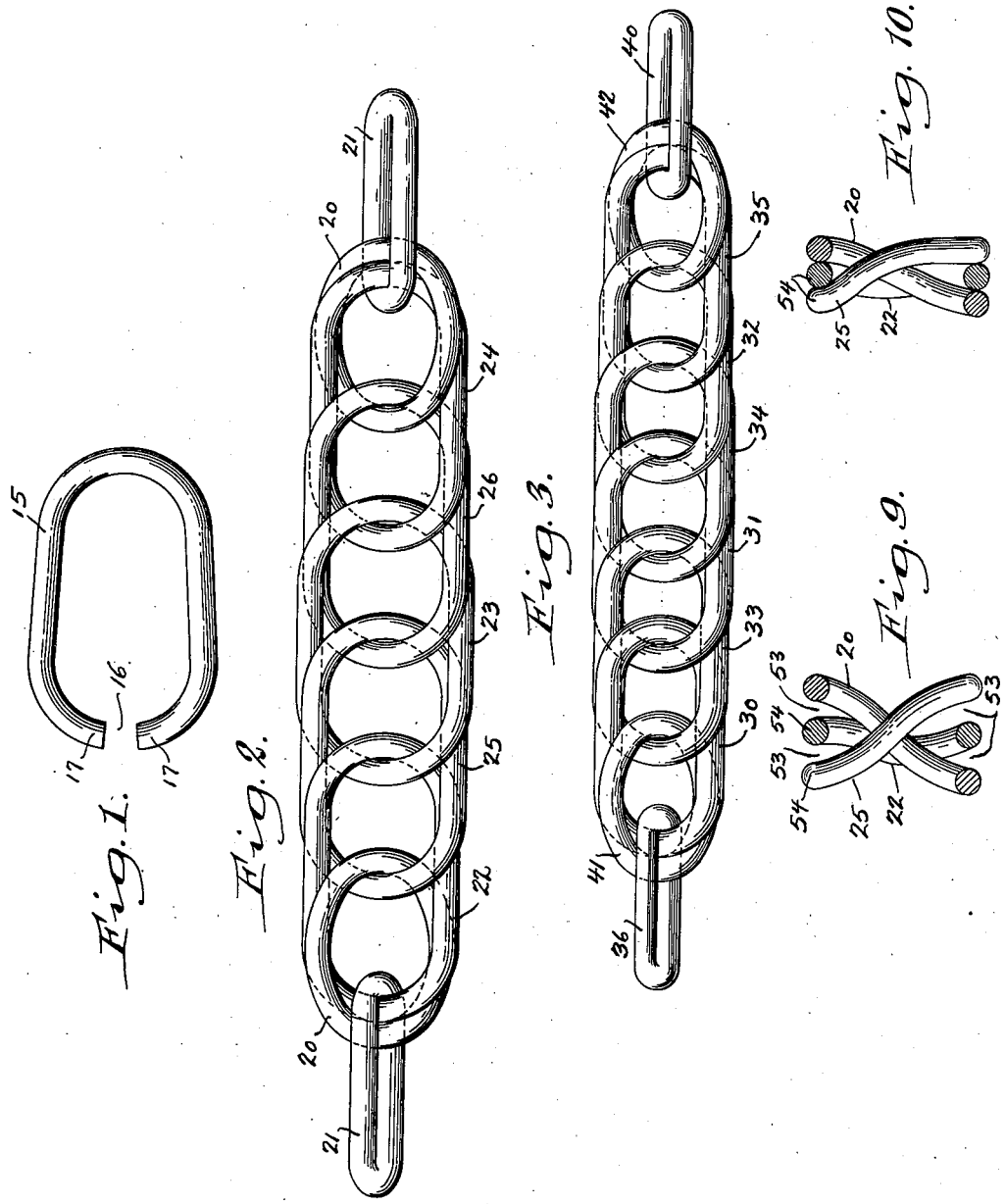
Inventor,
FRANK E. STAHL
by  JW McEllis
        Attorney.

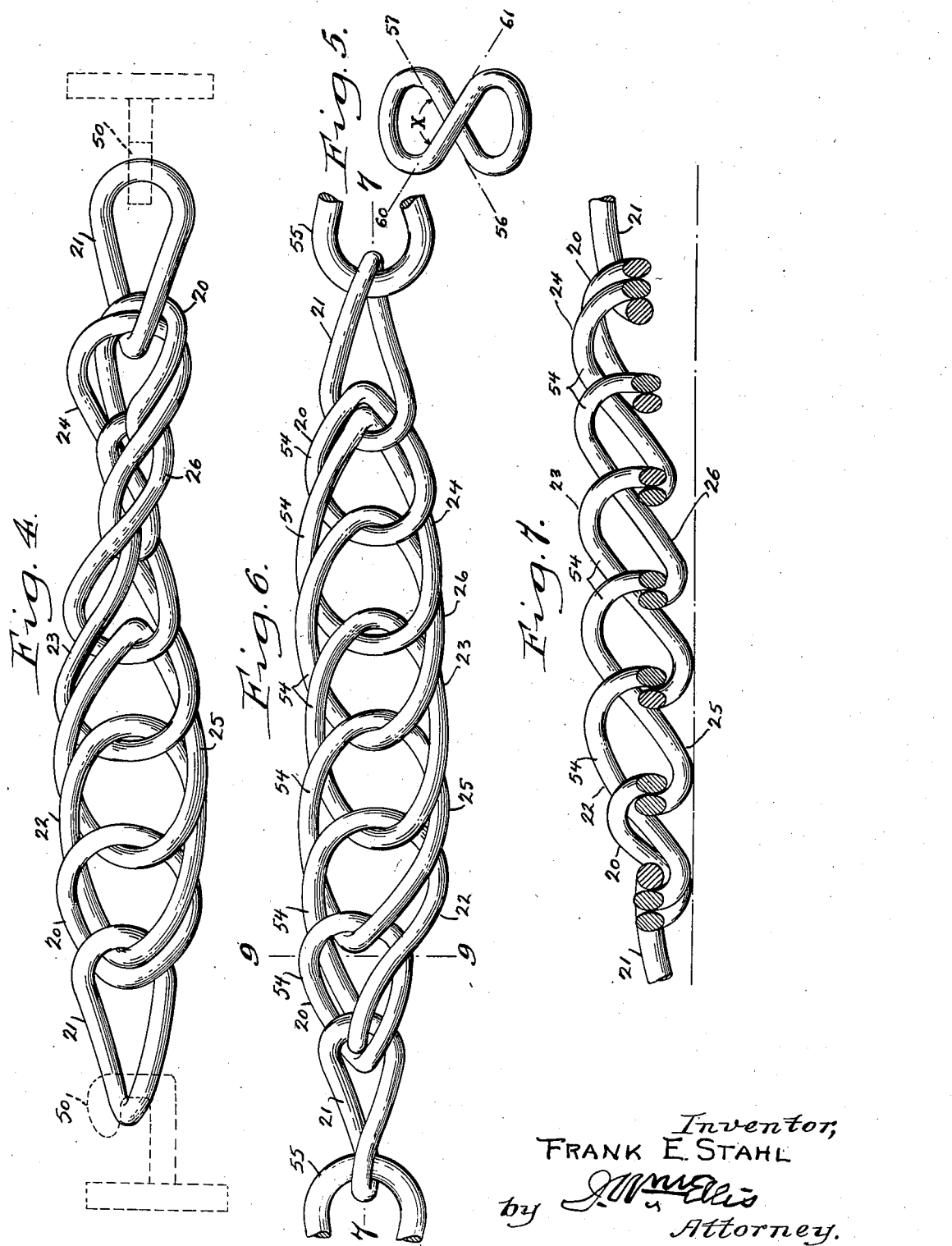

April 9, 1940. F. E. STAHL 2,196,686
METHOD OF MAKING CHAINS
Filed April 8, 1938 3 Sheets-Sheet 3
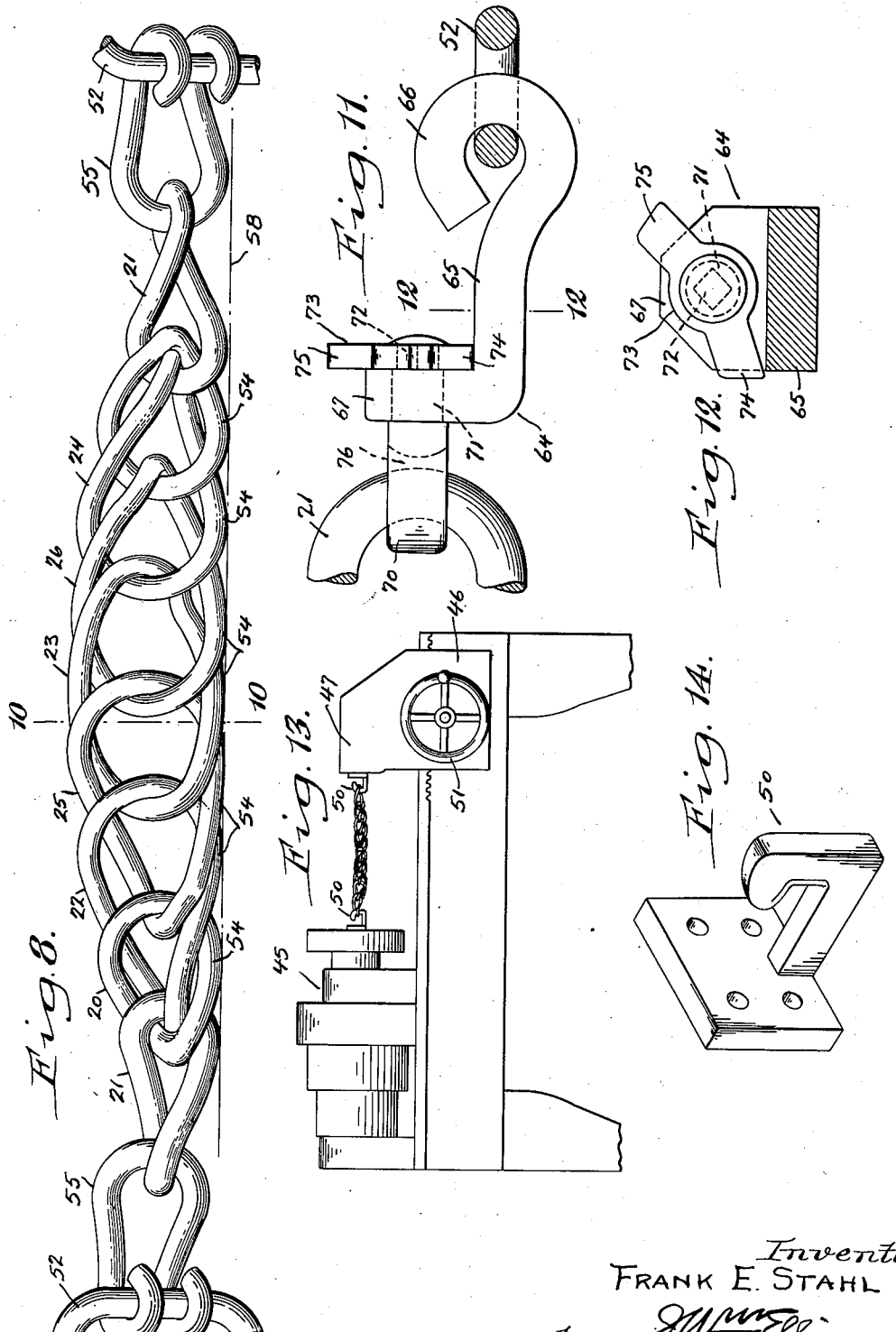
Inventor,
FRANK E. STAHL
by J.W. Ellis
Attorney.

Patented Apr. 9, 1940

2,196,686

UNITED STATES PATENT OFFICE 2,196,686

METHOD OF MAKING CHAINS

Frank E. Stahl, Tonawanda, N. Y.; Lillie M. Stahl, administratrix of said Frank E. Stahl, deceased, assignor to Columbus McKinnon Chain Corporation, Tonawanda, N. Y., a corporation of New York Application April 8, 1938, Serial No. 200,953

17 Claims. (Cl. 59—35)

My invention relates in general to a method of making chains and more particularly to a method of making anti-skid cross chains.

It is well known to those skilled in the art that at present, large pneumatic tires are used on implements for use on farms and road work such, for instance, as tractors, and it is very desirable and essential that suitable anti-skid means be provided for insuring proper and effective traction of the tires of such devices.

Furthermore, it is desirable and quite necessary in devices of this nature which are to be used on soft, yielding materials, such, for instance, as earth, mud, and the like, that the traction surface offered by the chains shall extend a substantial distance above the periphery of the tire so as to properly engage the material over which the device is being driven. It is, however, desirable that this traction surface be at a minimum when the device is being driven over pavement.

It has, therefore, been a principal object of my invention to provide a method whereby a cross chain may be formed having links so assembled and twisted, in the course of manufacture, that such links will lie flatly upon the tire under normal conditions, but which, when traction is needed, will be rotated on their axes so as to turn the adjacent links substantially on their side edges, thus presenting their maximum traction surfaces.

Another object has been to provide a method of making a chain whereby the links shall be interengaged to form two complete chain assemblies, each chain assembly being connected to the joiner links at the ends of the cross chain.

In the accompanying drawings, I have shown two ways of assembling the links and one form of apparatus whereby the assembled and welded links may be twisted, it being obvious that other ways of assembling and other forms of apparatus for twisting may be used in carrying out my method. In the drawings:

Fig. 1 shows one of the partially formed links used in my method of making a cross chain.

Fig. 2 shows a top, plane view of a series of links assembled in one form of cross chain and before being twisted.

Fig. 3 shows a slightly reduced, top, plan view of another form of assembled links before being twisted.

Fig. 4 shows a similar view of a chain of the form shown in Fig. 2 after being twisted.

Fig. 5 is an end elevation of a single, disassembled link after being twisted, showing the angular relation of the ends thereof.

Fig. 6 shows a top, plan view of a cross chain made in accordance with my invention, showing it connected to the side chain hooks, indicated in fragmentary manner.

Fig. 7 is a fragmentary, side, sectional elevation of the cross chain shown in Fig. 6, and is taken on line 7—7 of that figure.

Fig. 8 is a side view of a cross chain made in accordance with my invention in its full traction position.

Fig. 9 is a sectional view of the chain showing the links in the normal relative positions taken on line 9—9 of Fig. 6.

Fig. 10 is a sectional view taken on line 10—10 of Fig. 8, showing the adjacent links nested in their full traction position.

Fig. 11 is a side view of a swivel to be used in connection with chains having their links twisted a minimum amount.

Fig. 12 is a sectional view of the swivel taken on line 12—12 of Fig. 11.

Fig. 13 is a side elevation of an apparatus for twisting the cross chains after being assembled.

Fig. 14 is an enlarged, perspective view of one of the hooks to hold each end of the chain while it is being twisted.

As hereinbefore pointed out, the chains made according to my invention comprise two series of links made into two complete chains. The links are assembled as the chains are being formed and they are so arranged that the links of one chain are engaged with each other and are interengaged within the links of the other chain. Each end of each of the interengaged chains is suitably connected to a joiner link, to be hereinafter described, so that each of the chains takes its portion of the load placed upon the cross chain. Furthermore, as hereinbefore pointed out, it is necessary in a chain of this type which is to be used on soft, yielding material, such as earth, mud, sand, or the like, that considerable anti-skid surface be presented in order to provide the proper amount of traction. In order to do this, I form the links of the cross chain, in the course of manufacture, with a definite amount of twist, and when the assembled cross chains are to be attached to the side or rim chains of an anti-skid device, I place in the chain an initial twist, so that when the chain is in service and maximum traction is needed, it will be free to partially rotate on its axis, whereby the links will be brought to such positions as to present maximum traction. In order to accomplish these results, it is necessary to use relatively large links made from material of relatively small cross-section, as clearly shown in the drawings.

In forming the cross chain in accordance with my method, I first provide a plurality of individual links 15. Each of these links when formed has a gap 16 left in one of its ends, preferably by leaving a space between the ends 17 of the stock forming the link. As shown in the drawings, each of my chains is formed with a ring link 20 at each end thereof and also with a joiner link 21 connecting the ring link and one end of one of the chain assemblies, as clearly shown in Fig. 2 for purposes to be hereinafter described.

Before assembling the chain links 15, in accordance with my method, it is preferable to first assemble each joiner link 21 with its coacting ring link 20, and these two several parts of the chain are each separately welded in well known manner. One of the links 15 is then assembled, having its gap 16 passed over the periphery of the ring link 20 and engaged with the joiner link 21, whereupon the gap 16 is preferably closed up by forcing the ends 17 of the stock together, after which the ends are welded by suitable means. The link just assembled is represented in Fig. 2 by the numeral 22. This is the first link of the main chain assembly of the form of cross chain shown in Fig. 2. The other links of this main chain assembly are links 23 and 24. This chain is also formed with an intermediate chain assembly formed by links 25 and 26. After the first link 22 of the main chain assembly is assembled, as just above pointed out, the first link 25 of the intermediate chain assembly has its gap 16 passed over the first link 22 and engaged with the ring link 20, after which the gap of the link is closed up and the ends welded. It will be seen that each link as it is assembled is placed so that its upper side is below the upper side of the next preceding link, and its lower side is above the same side of the next preceding link, as shown in Fig. 2, whereby the links when completely assembled are arranged in helical form. The chain is now ready to receive the third link 23, which is the second link of the main chain assembly, and its gap is passed over the link 25 and engaged with the first link 22 of this assembly, whereupon it also has its ends closed up and welded. The fourth link 26 of the cross chain, which is the second link of the intermediate chain, is then ready to be assembled. Since this is the end link of the intermediate chain assembly, it must be connected to the ring link 20 at this end of the chain and, in the asembling, therefore, its gap is first passed over this ring link, after which it is passed over the link 23 and is engaged with the other link 25 of this assembly, after which its ends are closed up and welded. The fifth link 24 of the cross chain, being the third link of the main chain assembly, is now ready to be assembled. Since this end link of the main chain assembly is to be connected to the joiner link 21, the gap thereof is first passed over the ring link 20, after which it is engaged with the joiner link 21. The link 24 is then passed over the link 26 and engaged with the link 23, whereupon the ends are bent toward each other and welded together.

Instead of having the cross chains formed with a main chain assembly of an odd number of links and an intermediate chain assembly of an even number of links, it is obvious that my method may be employed in the formation of a chain, such as that shown in Fig. 3, where two supplemental chain assemblies are shown, each having a similar number of links. One chain assembly is formed by the links 30, 31, 32, and the other supplemental chain assembly is formed by links 33, 34, and 35. The joiner link 36 is connected directly to the end link 30 of one supplemental chain, and the joiner link 40 is directly connected to the end link 35 of the other supplemental chain, the joiner link 36 being connected to the link 33 by means of the ring link 41 and the joiner link 40 being connected to the link 32 by means of the ring link 42. The links of this form of chain are assembled in helical formation in substantially the same manner as those just above described in connection with the assembling of the links of the form of cross chain shown in Fig. 2, and it is not deemed necessary, therefore, to describe in detail the steps of assembling the links of the form of chain shown in Fig. 3.

After my chain has been assembled and the joints thereof welded, as just above described, it is ready to be twisted. Any suitable means may be used to twist the chain, but I prefer to use an apparatus such as shown in Fig. 13, comprising a modified lathe having a headstock 45 designed to be rotated by suitable power means (not shown) and a carriage 46 having a head 47. The headstock 45 and the head 47 each carry a hook 50 shown enlarged in Fig. 14. When twisting the assembled chain of Fig. 2, the joiner link 21 at one end is engaged with the hook carried by the headstock 45, and the joiner link 21 at the opposite end of the chain is engaged by the hook carried by the head 47 of the carriage 46. When the chain of Fig. 3 is to be twisted, the joiner link 36 at one end thereof is connected, for instance, to the headstock 45, and the joiner link 40 at the opposite end thereof is engaged with the hook carried by the head 47. The carriage is then moved backwardly by means of the operating wheel 51 until substantially all the slack has been taken out from between the links of the chain and the chain is drawn taut from one end to the other. When the chain is in this position, the links thereof are centralized by being moved so as to bring their axes substantially coincident, after which the headstock is operated so as to cause the hook 50 carried thereby to be rotated a suitable number of rotations in the proper direction, whereby each link is given the proper degree of twist. The direction of relative rotation of the ends of the chain during the twisting operation will be opposite to the path of the helix of the assembled links.

As hereinbefore pointed out, when the cross chains made in accordance with my method are attached to the links 52 of the side or rim chains of an anti-skid device, an initial twist is placed in the chain, as clearly shown in Figs. 6 and 7. After such initial twist is placed in the chain, spaces 53 remain between the links, as clearly shown in Fig. 9, thus allowing perfect flexibility and freedom of movement of the links about the tire. Such initial twist does, however, place the chain in such position that when maximum traction is needed, the material over which the chain is being passed will first engage with the sides 54 of the links 20 and 22 and perhaps the similar side of the link 25 (see Fig. 6), which are sides of the links that are nearest to the material over which the device is being passed. When these sides engage with the material, the chain will be turned on its axis starting, for example, with the end of the chain having the link 22, thus taking up all the spaces 53 between the links and bringing them to a fully nested position, as shown in Figs. 8 and 10, which is the full traction position of the chain, the line 58 of Fig. 8 representing the roadway or ground and being shown straight for convenience of illustration. Further twisting of the cross chain is prevented by its connection to the link 52 of the side or rim chain by means of the hook 55 which, as clearly shown, serves to connect the link 52 with the joiner links 21. I have found that in order to have the cross chain function as just above described, it is necessary that each link be twisted a definite amount and that the joiner links 21, as well as the ring links 20 of the form of Fig. 2, or the joiner links 36 and 40, and ring links 41 and 42 of Fig. 3, be also twisted a definite amount. It has been my experience that the twisting should continue until the ends of the links have been turned through an angle of substantially 120°. This twisting is shown by the end view of the link shown in Fig. 5, where line 56—57 represents a straight-line drawn parallel to the side of the stock at one end of the link and line 60—61 represents a line drawn parallel to the stock at the opposite end of the link. The amount of twist between these two lines is represented by the line X. While this is the preferable angle, such angle may be increased to substantially 140°, or the links may be twisted only substantially 90°, if desired. When the cross chain is connected by means of the hooks 55 to the links 52 of the side or rim chains, it is very desirable that the portion of the joiner links which connects the hooks shall be normally disposed at substantially 90° to that portion of the hook which engages the link. In order to bring this about, it is preferable that the joiner hooks be twisted such an amount that the ends thereof are arranged at an angle of substantially 90°, as shown in Fig. 6. When the twist in the link is such that the angle X of Fig. 5 is only 90°, then it is desirable to twist the joiner links beyond 90°, or to use some swivel connection between the joiner link and the hooks 55 which will permit a limited amount of rotative or swiveling movement. Such a device is shown, for convenience, in Figs. 11 and 12.

As here shown, the swivel 64 comprises a body 65 having a hook portion 66 at one end thereof for engagement with the link 52 of the side or rim chain of the anti-skid device. At the opposite end of the body 65 is formed an upturned angle portion 67. Carried at the forward end of the swivel body is a swivel ring 70 which is provided with a cylindrical stud 71, whereby it is rotatably carried by the angle portion 67 of the body. Extending from the stud 71 is a square-shaped stud 72 upon which is mounted a stop member 73 having stop arms 74 and 75. The stud 72 is longer than the thickness of the stop member and its end is riveted over to secure the stop member in place upon the stud, whereby the stop member will be rotatable with the stud of the swivel ring. The swivel ring is provided with an aperture 76 through which the joiner link 21 of one of the cross chains made in accordance with my invention may be placed. Either of the arms 74 or 75 of the stop member will engage with the body part 65 of the swivel as the swivel ring is rotated in either direction, thus permitting a limited amount of rotative movement of the joiner link 21 with respect to the side or rim chain link 52.

It will be clear from the drawings and the foregoing description that when assembling the cross chains to the side or rim chains, each cross chain is given an initial twist between its ends, such twist being in a counterclockwise direction when the chain is viewed from either end. Any pressure, therefore, which is brought to bear upon, for instance, the sides 54 of the links starting with the links 20, 22, and 25, or any force which would tend to rotate them in counterclockwise direction, when viewed from the left-hand end as shown in the drawings, will serve first to close up the spaces 53 (see Fig. 9), and in doing so, the links above mentioned will be relatively rotated so as to bring the sides 54, shown at the top of Fig. 6, and in elevation in Fig. 7, in contact with the road. As also hereinbefore pointed out, when such turning has continued the predetermined amount, all of the sides 54 of links 20 and the links 22, 25, 23, 26, and 24 of Fig. 2 will be brought to the position shown in Fig. 8 where they will afford maximum traction. The side or rim chains are so adjusted that further turning of the cross chain is substantially prevented by the hook 55 at the end of the chain which is the end where the turning starts. Such twisting is retarded by the swivel 64 in chains where such swivel is employed.

It is obvious that the cross chains made in accordance with my invention are so designed that the links thereof, in normal position, will be free to move relatively owing to the spaces 53 formed therebetween, and that any material which has been forced in between the links during the time it has occupied its traction position will be freed by such relative movement of the links. Furthermore, it will be obvious that the links, under normal conditions, will lie substantially flatly against the tire, thus causing the least possible wear upon the tire, such links, however, presenting the maximum traction surface only when needed and when produced by the turning action above described.

In the two forms of chain made in accordance with my invention and shown in Figs. 2 and 3, the links are arranged in overlapped relation and in such manner that the joint between any two adjacent chain links of the main chain or the joint between any two adjacent chain links of one of the supplemental chains will lie at the center of one of the links of the intermediate chain or at the center of one of the links of the other supplemental chain. In each of these structures, the ring link 20 of Fig. 2, or the ring links 41 and 42 of Fig. 3 are employed at each end of the cross chain to connect the main and intermediate chain assemblies of the form of Fig. 2, or the two supplemental chain assemblies of the form of Fig. 3. It is obvious that, instead of the forms of chain just above mentioned, it is within the scope of my invention to form chains having links arranged in pairs. The links of each pair may, if desired, be substantially of the same size and arranged alongside of or on top of each other, or they may be of such relative size as to nest, one within the other, both links of each pair being connected to both links of an adjacent pair. In such a structure the ring links would not be necessary and both chain assemblies would be directly connected to the joiner links at the ends of the chain. With such a structure, all the advantages of the forms of invention hereinbefore shown and described may be achieved. The relatively large link may be employed, made of wire having a relatively small cross-sectional area. Such a chain would be twisted in substantially the same manner as that described in connection with the forms of Figs. 2 and 3. Furthermore, my method is applicable to a chain made of a series of oval links and an interengaging series of substantially round links.

While I have described the twisting of the cross chains made by my method as being in counterclockwise direction when viewed from either end, it is obvious that, if desired, the links may be assembled so as to be helically arranged in counterclockwise direction and thereafter twisted in clockwise direction and the same results obtained.

Having thus described my invention, what I claim is:

1. A method of making an anti-skid cross chain having two complete, interengaged chain units, comprising preparing a plurality of large, separate links, each made from wire having a relatively small cross-sectional area, each link having a gap to facilitate assembling, successively assembling said links in helical, interengaging manner in the formation of the chain units, successively closing the gap in each link as it is assembled and welding the adjacent ends of the link stock, connecting the adjacent ends of the chains together by means of a joiner link, and then twisting the assembled cross chain so that each link receives a twist in excess of substantially 90°.

2. A method of making an anti-skid cross chain having two complete, interengaged chain units, comprising preparing a plurality of large, separate links, each made from wire having a relatively small cross-sectional area, each link having a gap to facilitate assembling, successively assembling said links in helical, interengaging manner in the formation of the chain units, successively closing the gap in each link as it is assembled and welding the adjacent ends of the link stock, connecting the adjacent ends of the chains together by means of a joiner link, the stock of which has a cross-sectional area greater than the cross-sectional area of the stock of the chain links, and then twisting the assembled cross chain so that each link receives a twist in excess of substantially 90°.

3. A method of making an anti-skid cross chain having two complete, interengaged chain units, comprising preparing a plurality of large, separate links, each made from wire having a relatively small cross-sectional area, each link having a gap to facilitate assembling, successively assembling said links in helical, interengaging manner in the formation of the chain units, successively closing the gap in each link as it is assembled and welding the adjacent ends of the link stock, connecting the adjacent ends of the chains together by means of a joiner link, and then twisting the assembled cross chain so that each link receives a twist of not less than substantially 90° and not over substantially 140°.

4. A method of making an anti-skid cross chain having two complete, interengaged chain units, comprising preparing a plurality of large, separate links, each made from wire having a relatively small cross-sectional area, each link having a gap to facilitate assembling, successively assembling said links in helical interengaging manner in the formation of the chain units, successively closing the gap in each link as it is assembled and welding the adjacent ends of the link stock, connecting the adjacent ends of the chains together by means of a joiner link, and then twisting the assembled cross chain so that each link receives a twist of substantially 120°.

5. A method of making an anti-skid cross chain having two complete, interengaged chain units, comprising preparing a plurality of large, separate links, each made from wire having a relatively small cross-sectional area, each link having a gap to facilitate assembling, successively assembling said links in helical, interengaging manner in the formation of the chain units, successively closing the gap in each link as it is assembled and welding the adjacent ends of the link stock, connecting the adjacent ends of the chains together by means of a joiner link, and then twisting the assembled cross chain in a direction opposite to the direction of the helix formed by the links when first assembled, so that each link receives a twist in excess of substantially 90°.

6. A method of making an anti-skid cross chain having two complete, interengaged chain units, comprising preparing a plurality of large, separate links, each made from wire having a relatively small cross-sectional area, each link having a gap to facilitate assembling, successively assembling said links in helical, interengaging manner in the formation of the chain units, successively closing the gap in each link as it is assembled and welding the adjacent ends of the link stock, connecting the adjacent ends of the chains together by means of a ring link and a joiner link, and then twisting the assembled cross chain so that each link receives a twist in excess of substantially 90°.

7. A method of making an anti-skid cross chain having two complete, interengaged chain units of different lengths, comprising preparing a plurality of large, separate links, each made from wire having a relatively small cross-sectional area, each link having a gap to facilitate assembling, successively assembling said links in helical, interengaging manner in the formation of the chain units, successively closing the gap in each link as it is assembled and welding the adjacent ends of the link stock, connecting the adjacent ends of the chain units together and then twisting the assembled cross chain so that each link receives a twist in excess of substantially 90°.

8. A method of making an anti-skid cross chain, comprising preparing a plurality of large, separate links, each made from wire having a relatively small cross-sectional area, each link having a gap to facilitate assembling, preparing two ring links and two joiner links, assembling a joiner link and a ring link, then successively assembling said chain links in helical, interengaged manner, having the first link engaging the joiner link and the second link engaging the ring link, and the last link engaging the joiner link at the opposite end of the chain and the second last link engaging the ring link at the opposite end of the chain, successively closing up the gap in the chain links as they are assembled, and welding them immediately after assembling, and then twisting the assembled cross chain so that each link receives a twist in excess of substantially 90°.

9. A method of making an anti-skid cross chain, comprising preparing a plurality of large, separate links, each made from wire having a relatively small cross-sectional area, each link having a gap to facilitate assembling, preparing two ring links and two joiner links, assembling a joiner link and a ring link, then successively assembling said chain links in helical, interengaged manner, having the first link engaging the joiner link and the second link engaging the ring link, and the last link engaging the joiner link at the opposite end of the chain and the second last link engaging the ring link at the opposite end of the chain, successively closing up the gap in the chain links as they are assembled, and welding them immediately after assembling, then holding one end of the assembled cross chain in substantially rigid manner, and then rotating the other end, whereby each link will receive a twist in excess of substantially 90°.

10. A method of making an anti-skid cross chain having a main chain assembly and an intermediate chain assembly, comprising preparing a plurality of large, separate links, each made from wire having a relatively small, cross-sectional area, each link having a gap to facilitate assembling, successively assembling said links in such manner that the sides of the link of the intermediate chain are positioned between the sides of the adjacent links of the main chain assembly, successively closing the gap in each link as it is assembled, welding the adjacent ends of the link stock, connecting the adjacent ends of the chain assemblies together by means of a joiner link, and then twisting the assembled chain so that each link receives a twist in excess of 90°.

11. A method of making an anti-skid cross chain having two complete, interengaged chain units, comprising assembling links in interengaging manner in the formation of the chain units with adjacent links of one unit interengaging each other within a link of the companion unit, whereby said links are interengaged, connecting the adjacent ends of the units together for unit support, and then twisting the interengaged units as an entirety.

12. A method of making an anti-skid cross chain having two complete, interengaged chain units, comprising assembling links in helical, interengaging manner in the formation of the chain units with adjacent links of one unit interengaging each other within a link of the companion unit, whereby said links are interengaged, connecting the adjacent ends of the units together for unit support, and then twisting the interengaged units as an entirety in a direction opposite to the helical arrangement of the links after being assembled.

13. A method of making an anti-skid cross chain having two complete, interengaged chain units, comprising successively assembling links in helical, interengaging manner in the formation of the chain units with adjacent links of one unit interengaging each other within a link of the companion unit, whereby said units are interengaged, connecting the adjacent ends of the units to a joiner link for support thereby, and then twisting the interengaged units as an entirety.

14. A method of making an anti-skid cross chain having two complete, interengaged chain units, comprising successively assembling links in helical, interengaging manner in the formation of the chain units with adjacent links of one unit interengaging each other within a link of the companion unit, whereby said units are interengaged, connecting the adjacent ends of the units to a joiner link for support thereby, and then twisting the interengaged units as an entirety in a direction opposite to the helical arrangement of the links after being assembled.

15. A method of making an anti-skid cross chain having two complete, interengaged chain units, comprising successively assembling links in helical, interengaging manner in the formation of the chain units with adjacent links of one unit interengaging each other within a link of the companion unit, whereby said units are interengaged, connecting the adjacent ends of the units to a joiner link for support thereby, and then twisting the engaged units as an entirety so that each links receives a twist in excess of 90°.

16. A method of making an anti-skid cross chain having two complete, interengaged chain units, comprising preparing a plurality of separate links, each link being formed to facilitate assembling, successively assembling such links in helical, interengaging manner in the formation of the chain units with adjacent links of one unit interengaging each other within a link of the companion unit, whereby said units are interengaged, connecting the adjacent ends of the units to a joiner link for support thereby, and then twisting the engaged units as an entirety.

17. A method of making an anti-skid cross chain having two complete, interengaged chain units, comprising preparing a plurality of separate links, each link having a gap to facilitate assembling, successively assembling such links in helical, interengaging manner in the formation of the chain units with adjacent links of one unit interengaging each other within a link of the companion unit, whereby said units are interengaged, connecting the adjacent ends of the units to a joiner link for support thereby, and then twisting the engaged units as an entirety.

FRANK E. STAHL.